United States Patent
Adler et al.

(10) Patent No.: US 11,251,986 B2
(45) Date of Patent: Feb. 15, 2022

(54) AUTOMATICALLY CONFIGURING FUNCTIONAL UNITS OF AN AUTOMATION SYSTEM

(71) Applicant: SIEMENS AKTIENGESELLSCHAFT, Munich (DE)

(72) Inventors: Michael Adler, Nürernberg (DE); Klaus-Peter Hofmann, Aurachtal-Münchaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/476,338

(22) PCT Filed: Nov. 8, 2017

(86) PCT No.: PCT/EP2017/078591
§ 371 (c)(1),
(2) Date: Jul. 8, 2019

(87) PCT Pub. No.: WO2018/130320
PCT Pub. Date: Jul. 19, 2018

(65) Prior Publication Data
US 2019/0356503 A1 Nov. 21, 2019

(30) Foreign Application Priority Data
Jan. 12, 2017 (EP) .................................... 17151205

(51) Int. Cl.
*H04L 12/28* (2006.01)
*G06F 8/70* (2018.01)
(52) U.S. Cl.
CPC ............ *H04L 12/2814* (2013.01); *G06F 8/70* (2013.01); *H04L 12/283* (2013.01)

(58) Field of Classification Search
CPC ...... H04L 12/2814; H04L 12/283; G06F 8/70
See application file for complete search history.

(56) References Cited

U.S. PATENT DOCUMENTS 7,124,289 B1* 10/2006 Suorsa ...................... G06F 8/61
713/1
2006/0248045 A1* 11/2006 Toledano ............ H04L 63/0272
(Continued)

FOREIGN PATENT DOCUMENTS

| CN | 102763102 A | 10/2012 |
| CN | 102801776 A | 11/2012 |

(Continued)

OTHER PUBLICATIONS

European Search Report for European Patent Application No. 17151205.6-1802 dated Jun. 14, 2017.
(Continued)

*Primary Examiner* — William G Trost, IV
*Assistant Examiner* — Monishwar Mohan
(74) *Attorney, Agent, or Firm* — Lempia Summerfield Katz LLC

(57) ABSTRACT

A method is provided for automatically creating data relating to an automation system, wherein a plurality of software agents is assigned to the automation system. The software agents are connected to the cloud via a gateway, wherein the cloud holds an agent configuration for each software agent. Data captured by at least some of the software agents and relate to at least one device, service, and/or data source of the automation system, which may be reached by the particular software agent, are received by the gateway. At least one software agent assigned to the automation system is configured by the gateway during processing of one or more agent configurations from the cloud and the captured data (Continued)

relating to at least one device, service, and/or data source may be reached by the particular software agent.

9 Claims, 2 Drawing Sheets

(56) References Cited

U.S. PATENT DOCUMENTS

| | | | |
|---|---|---|---|
| 2011/0083138 A1 | 4/2011 | Sivasubramanian et al. | |
| 2013/0138818 A1 | 5/2013 | Wolf | |
| 2013/0211546 A1* | 8/2013 | Lawson | H04L 67/16 700/9 |
| 2014/0020244 A1* | 1/2014 | Carlson | H02J 3/32 29/825 |
| 2014/0172957 A1* | 6/2014 | Baum | H04L 12/66 709/203 |
| 2015/0121485 A1* | 4/2015 | Collins | G06F 8/61 726/5 |
| 2015/0281355 A1 | 10/2015 | Maturana et al. | |
| 2015/0304399 A1 | 10/2015 | Kramer | |
| 2017/0206255 A1* | 7/2017 | Crabtree | G16H 40/67 |
| 2017/0237813 A1* | 8/2017 | Hofmann | H04L 67/12 726/12 |
| 2017/0336947 A1* | 11/2017 | Bliss | G06F 3/04842 |
| 2019/0050414 A1* | 2/2019 | Maturana | G06F 16/164 |

FOREIGN PATENT DOCUMENTS

| | | |
|---|---|---|
| CN | 104838354 A | 8/2015 |
| CN | 104950836 A | 9/2015 |

OTHER PUBLICATIONS

PCT International Search Report and Written Opinion of International Searching Authority dated Feb. 8, 2018 corresponding to PCT International Application No. PCT/EP2017/078591 filed Nov. 8, 2017.

Chinese Office Action for Chinese Application No. 201780083215.6 dated Oct. 11, 2021, with English translation.

* cited by examiner

FIG 2

Agent Gateway Configuration — 58

AGENT_GW consist of AGENT1, AGENT2

FIG 3

Agent Configuration — 60, 62

AGENT1:
    IP:192.168.100.81/24
    S7_Project1 → read DB1.DW10 as temperature
    S7_Project1 → read DB8.DX1.0 as running
    S7_Project2 → read DB1.DX10 as current
    UA_Server1 → read UA_rotation as rotation speed AGENT2:
    IP:192.168.100.82/24
    S7_Project3 → read DB10.DW20 as count
    S7_Project3 → read DB8.DX1.0 as running

FIG 4

Agent Device List — 64

AGENTX:
    S7_Project1 on 192.168.100.11,
    S7_Project2 on 192.168.100.12,
    UA_Server1 on 192.168.100.20

AGENTY:
    S7_Project3 on 192.168.100.13

US 11,251,986 B2

AUTOMATICALLY CONFIGURING FUNCTIONAL UNITS OF AN AUTOMATION SYSTEM

The present patent document is a § 371 nationalization of PCT Application Serial No. PCT/EP2017/078591, filed Nov. 8, 2017, designating the United States, which is hereby incorporated by reference, and this patent document also claims the benefit of European Patent Application No. 17151205.6, filed Jan. 12, 2017, which is also hereby incorporated by reference.

TECHNICAL FIELD

The disclosure relates to a method for automatically creating data relating to an automation system, e.g., a method for automatically configuring functional units of the automation system based on the data created. The functional units to be configured are, for example, what are known as software agents. Furthermore, the disclosure relates to a computer program having an implementation of the method as well as to a device operating according to the method, e.g., a gateway operating according to the method and acting as an interface between the automation system and what is known as the cloud.

BACKGROUND

The Internet of Things is a new name for a trend which is known in principle in data processing, particularly in data processing in connection with an automation of a technical process or technical processes. More and more devices used for automation possess an Internet connection or are connected to one other for communication purposes via the Internet.

In the following, a technical process to be automated together with an automation system intended for the automation thereof is referred to as an automation solution for short. Such an automation solution may include a large number of units, machines, automation devices, and the like, which in a general view represent data sources (e.g., assets). To capture data from such data sources, what are known as agents (e.g., software agents) are used. An agent captures data of a data source and sends it via an Internet connection to what is known as the cloud. The data is stored and/or processed in the cloud, for instance.

Each agent is configured and/or parameterized. For instance, the agent receives a unique address, (e.g., an IP address), during a network configuration. Furthermore, each agent is assigned a unique identifier (e.g., identity) as well as one or more data source(s) to be used by the agent. Data which is to be loaded into a memory of the agent and to this end transferred to the agent, (e.g., via the Internet), includes software updates, certificates, or access data for accessing individual data sources for instance or for authentication with the cloud or a service in the cloud.

Until now, such a configuration/parameterization of an agent has been performed manually by a user, for instance, by the user transporting the data by a mobile data carrier, (e.g., in the form of a USB stick or the like), to the location of the automation solution and there transferring stored data to at least one agent. A software update may take place via the Internet. However, the in some cases significant data volume means that this is associated with a not inconsiderable consumption of resources.

With the constantly growing complexity of automation solutions, the number of functional units included therein is increasing. A manual configuration/parameterization of all agents assigned to an automation solution is therefore time-consuming and above all prone to error.

U.S. Patent Application Publication No. 2013/0211546 A1 discloses a cloud-enabled, intelligent device that enables the automated configuration and integration of the device into an automation system. During installation within the automation system, the intelligent device determines its geographical location, identifies other devices in the system, and determines its role within the system. The intelligent device then establishes communication with a cloud platform, on which one or more cloud-based applications or services are running and sends a device profile containing the collected information to the cloud platform. The device profile may be used to configure the device automatically for operation within the system or to add the smart device to an existing cloud-based application.

U.S. Patent Application Publication No. 2015/0121485 A1 discloses computer devices that are coupled to a network and configured automatically. System information is collected from a plurality of computer devices by an agent and/or a scout. This information is standardized and stored in one or more databases. A program function is determined from the standardized information. This program function is used to identify two different groups of computer programs, which are installed on a series of networked computer devices. This configuration is then replaced by a configuration in which only one single, common computer program is used to execute the program function.

SUMMARY AND DESCRIPTION

Based on the disadvantages outlined above, an object of the present disclosure is to specify a method for automatically configuring functional units of an automation system that at least avoids individual disadvantages or reduces their effects.

The scope of the present disclosure is defined solely by the appended claims and is not affected to any degree by the statements within this summary. The present embodiments may obviate one or more of the drawbacks or limitations in the related art.

According to one embodiment, a method for automatically creating data relating to an automation system is proposed. Several software agents are assigned to the automation system, with the software agents being connected to the cloud via a (e.g., common) gateway. One or more software agents may be present in the gateway and/or have a communication connection with the gateway.

One agent configuration is stored in the cloud for each of the software agents. Each software agent may thus access an agent configuration assigned to it. The agent configuration may be an agent configuration that has been predefined, for instance by a user.

Furthermore, data captured by at least one part of the software agents relating to at least one device, service, and/or data source of the automation system that may be reached by the respective software agent is received by the gateway. This data may be present in the form of a list, for instance.

During processing of one or more agent configurations from the cloud and the captured data relating to the at least one device, service, and/or data source that may be reached by the respective software agent, at least one of the software agents assigned to the automation system is configured by the gateway. For this purpose, an agent configuration may be assigned to a software agent based on the data relating to the device(s), service(s), and/or data source(s) that may be reached by the respective software agent.

The software agents may be connected to the cloud via the gateway. In certain examples, the software agents do not have their own (e.g., direct) connection to the cloud.

According to a further development, a method for automatically creating data relating to an automation system, namely data for automatically configuring functional units of an automation system, is proposed. Herein, the following is provided: At least one software agent is assigned to the automation system as a functional unit to be configured. The or each software agent is connected to what is known as the cloud via a gateway. One agent configuration is stored in the cloud for a plurality of software agents, for instance, also for software agents of other automation systems. Each software agent of an automation system captures data relating to devices, services, data sources, and the like that may be reached locally, (e.g., may be reached by the agent), and this data is transmitted to the gateway in the form of a device list. During processing of the agent configuration from the cloud and of the device list, the gateway automatically detects matches in both data groups. Based on the detected matches and the data included in the agent configuration, the gateway automatically configures the software agent(s) assigned to the automation system.

An advantage of the disclosure includes the significantly simplified configuration/parameterization of software agents used in an automation solution as an interface to what is known as the cloud. The simplification results from all required data automatically being loaded into a respective memory of the software agent(s).

Until now, such a configuration/parameterization has been performed manually by a user performing the configuration via a website. By the method proposed here, it is established which software agent(s) require configuration data (for instance, as a result of a replacement of the device on which the software agent is executed), and the data required for the configuration is automatically determined and transmitted to the respective software agent. A manual intervention is no longer necessary. This simplification results in a significant reduction in maintenance costs.

The method described in the following is implemented for automatic execution in the form of a computer program, where appropriate in the form of a distributed computer program. The computer program is intended for execution by a device acting as an interface to the cloud and described according to the customary terminology as a gateway. Where method acts or method act sequences are described in the following, this refers to actions that take place based on the computer program or under the control of the computer program unless it is indicated explicitly that individual actions are initiated by a user of the computer program. Use of the term "automatically" means at least that the action concerned takes place based on the computer program or under the control of the computer program.

It is clear to a person skilled in the art that in place of an implementation of a method in software, an implementation in firmware or in firmware and software or in firmware and hardware is possible. Therefore, for the description set forth here, it may be the case that the terms software or computer program also encompass other implementation possibilities, e.g., an implementation in firmware or in firmware and software or in firmware and hardware.

An exemplary embodiment of the disclosure will now be described in greater detail referring to the drawings. Objects or elements corresponding to one another are labeled with the same reference characters in all of the figures.

The exemplary embodiment or each exemplary embodiment is not to be understood as limiting the disclosure. Rather, in the context of the present disclosure, enhancements and modifications are certainly possible, in particular those which for the person skilled in the art are derivable, for example, by combination or modification of individual features or method acts included in conjunction with those described in the general or specific description part and in the claims and/or the drawings, with regard to the solution of the problem and by combinable features, lead to a new subject matter or new method acts or method act sequences.

BRIEF DESCRIPTION OF THE DRAWINGS

In the drawings:

FIG. 2 to FIG. 4 depict examples of data used or generated as part of the method proposed here, with individual identifiers of the data shown in the figures by way of example being reproduced in the representation in FIG. 1 and in the following text in a short form (e.g., "S7_Project1"="S7_1").

DETAILED DESCRIPTION

Figure 1:
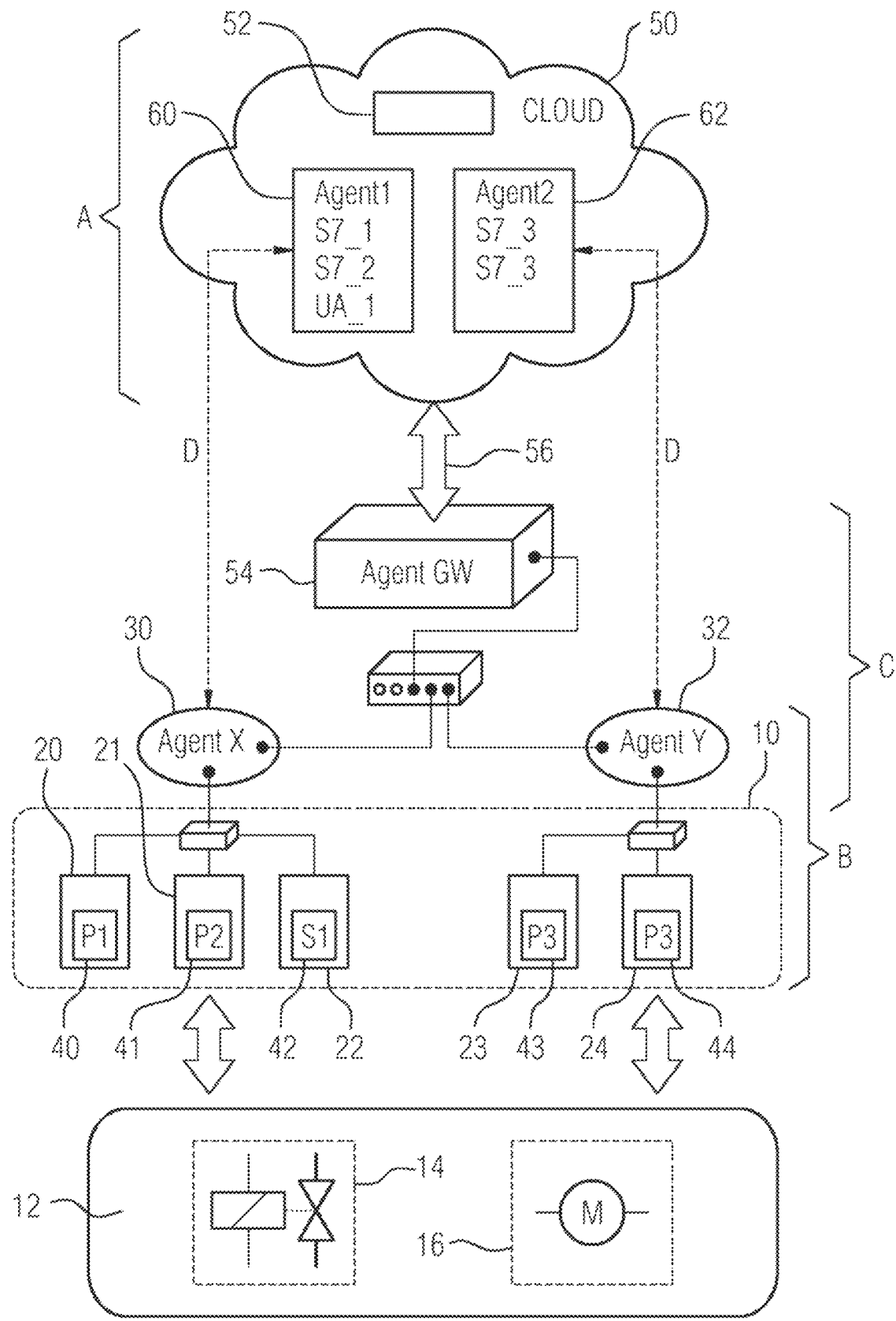
FIG. 1 depicts an example of an automation solution with an automation system and a controlled or monitored technical process, with a connection for communication purposes being established via a gateway between the automation system and what is known as the cloud.

The representation in FIG. 1 shows a schematically simplified view of an automation system 10 which is intended and configured in a manner which is known in principle for controlling and/or monitoring a technical process 12. The automation system 10 and the technical process 12 together form an automation solution for instance for an automatic manufacturing of products as part of the technical process 12 and under the control of the automation system 10.

The technical process 12, the specific form of which is not relevant in the following, includes, for example, actuators 14, 16 for influencing the technical process 12 and sensors for obtaining information about the state of the technical process 12. The technical process 12 is for instance a production process, a batch process, and so on.

For controlling and/or monitoring the respective technical process 12, the automation system 10 includes at least one automation device 20, e.g., a plurality of automation devices 20, 21, 22, 23, 24 connected to one another for communication purposes. The type of the automation devices 20-24 and the scale of the automation system 10 are likewise not relevant in the following.

At least one software agent 30, 32 is assigned to the automation system 10. The number and distribution of the agents 30, 32 shown in FIG. 1 is arbitrary and is to be understood only as an example. An agent 30, 32 acquires, for instance, a measured value or several measured values from the technical process 12 and/or activates or deactivates an actuator 14, 16 or several actuators 14, 16 in the technical process 12 or performs some other control with respect to an actuator 14, 16 (for instance, a setpoint specification for a speed control).

In the case of acquisition of a measured value or several measured values from the technical process 12, the respective agent 30, 32 performs a read operation. Such a read operation may relate to a variable of a control program 40, 41, 42, 43, 44 executed by the automation system 10, (e.g., by one of the automation devices 20-24 included therein). The result of the read operation or several such read operations is, for instance, intended for a service 52 stored in what is known as the cloud 50, and the respective item of data is consequently transmitted to the cloud 50. The service 52 is for instance a service 52 for storing and/or evaluating the transmitted data.

A switching device designated according to the customary terminology as a gateway 54 acts as an interface between the automation system 10 on the one hand and the cloud 50 on the other hand, and thus as an interface between an agent 30, 32 and a service 52 in the cloud. This is on the one hand connected directly or indirectly to the automation system 10, (for instance, via Ethernet), and on the other hand to the cloud 50 via the Internet 56.

The information needed for a transmission of data from agents 30, 32 of an automation system 10 into the cloud 50, (for instance, to a service 52), has until now been configured manually by a configuration engineer or programmer. According to the innovation proposed here, this takes place at least partly automatically.

As the basis for the automatic determination of data relating to an automation system 10 proposed here, namely of hierarchies and relationships in an automation system 10, certain initial information is required for the participating devices and units.

The gateway 54 receives information in the form of a manually input gateway configuration 58 (FIG. 2) indicating for which agent 30, 32 it is responsible (e.g., which agents 30, 32 it knows or must know):

AGENT GW consist of {Agent1, Agent2}

A gateway 54 receives further information relating to the or each agent 30, 32 for which it is responsible. For instance, the gateway 54 receives information indicating which data sources an agent 30, 32 uses and/or which data sources an agent 30, 32 may access. The gateway 54 receives this information from the cloud 50, namely from an agent configuration 60, 62 also originally entered manually and stored in the cloud 50 (FIG. 1 and FIG. 3):

Agent1 has {S7_1, S7_2, UA1} as a data source
Agent2 has {S7_3, S7_3} as a data source In the respective installation, (e.g., the respective automation system 10 and/or the controlled/monitored technical process 12), the agent 30, 32 obtains an overview of the devices, services, data sources, and the like available therein, and a list, referred to in the following as device list 64 (FIG. 4), of the devices, services, and the like which are available in the automation solution (e.g., installation) 10, 12 and may be reached by the agent 30, 32 is generated:

AgentX sees {P1, P2, S1}
AgentY sees {P3}

The symbolic identifiers "P1" or "S7_Project1", "P2" or "S7_Project2" and so on used by way of example for individual control programs 40, 41 and so on are also included in the representation in FIG. 1 and a data source is accordingly, for instance, a control program 40-44 executed during the control and/or monitoring of the technical process 12 or of a subprocess within the technical process 12, together with the data thereby generated and/or edited or processed.

Also in the automation solution 10, 12, the gateway 54 determines all agents 30, 32 of the automation solution 10, 12 that may be reached by the gateway 54 and generates a list referred to in the following as the agent list, in other words a list of agents 30, 32 of the automation solution 10, 12 that may be reached by the respective gateway 54:

AGENT_GW sees {AgentX, AgentY}

Based on the data now available, namely information entered by the user on the one hand and the automatically determined information of the device list 64 and the agent list on the other hand, a reference may be established automatically between the two data groups. The data is shown side by side in the following table to provide a quick overview:

| information entered | information determined automatically |
|---|---|
| AGENT_GW consist of { Agent1, Agent2 } | AGENT_GW sees { AgentX, AgentY } |
| Agent1 has { S7_1, S7_2, UA1 } as a data source | AgentX sees { P1, P2, S1 } |
| | AgentY sees { P3 } |
| Agent2 has { S7_3, S7_3 } as a data source | |

Based on the identifiably matching structures of the information entered and the information determined automatically, a reference may be established automatically between the two data groups. Accordingly, the agent designated as "Agent1" in the information entered is the agent 30, 32 (designated with the reference character 30 in the representation in FIG. 1) referred to as "AgentX" in the information determined automatically. In the same way, the agent designated as "Agent2" in the information entered is the agent 30, 32 (designated with the reference character 32 in the representation in FIG. 1) referred to as "AgentY" in the information determined automatically.

Based on the device list 64 and the agent configuration 60, 62, the gateway 54 may indicate to each agent 30, 32 which data it is to fetch from the automation solution 10, 12. For the "AgentX" referred to in FIG. 1 with the reference character 30, this means, for instance, that it reads the data word DW10 from the data block DB1 from the control program 40 with the symbolic designation "S7_Project1" (or "S7_1") and that this represents a temperature (FIG. 3: "S7_Project1→read DB1.DW10 as temperature").

For this assignment, the part of the agent configuration 60, 62 which is relevant to the respective agent 30, 32 is downloaded onto the respective agent 30, 32 in a form that may be processed by the agent 30, 32. The agent 30, 32 is thus configured, namely to read data from the automation solution 10, 12 in the example selected here. Prior to this configuration of an agent 30, 32 by the gateway 54, the respective agent 30, 32 has no information regarding the data to be read (or written). As part of such an assignment/configuration, all information regarding the data to be read (or written) is available to the agent 30, 32.

The data loaded from the cloud 50 onto an agent 30, 32 may be not only configuration data of this kind but also software updates, for instance. Further examples of data that may be loaded from the cloud 50 onto an agent 30, 32 are security information and what is known as "onboarding information", in other words data that an agent 30, 32 needs in order to establish a connection to the cloud 50. This list is not exhaustive and it is conceivable that other data may be loaded from the cloud 50 onto an agent 30, 32.

The method proposed here may therefore be summarized as follows (the letters used to designate the individual acts are shown in the representation in FIG. 1):

In act "A", the cloud 50 contains information in the form of the agent configuration 60, 62 indicating which tasks are assigned to which agent 30, 32, namely for instance the collection of data from a certain source and a unique addressing within the source.

In act "B", the agents 30, 32 (AgentX, AgentY) included in the automation solution 10, 12 collect information in their local network pertaining to sources that may be reached, and make this information available via a gateway 54.

For this purpose, each agent 30, 32 and each gateway 54 may have at its disposal two interfaces, namely on the one hand an interface to the respective automation solution 10, 12 (e.g., installation interface) and on the other hand an interface to the Internet 56 (e.g., Internet interface). Each agent 30, 32 determines all devices, services and so on that are connected to or may be reached via its installation interface. This takes place by what are known as discovery methods, which are known in principle. The information determined is stored in a device list 64 and transmitted to the gateway 54.

In act "C", from the collected information (e.g., device list 64) on the one hand and the agent configuration 60, 62 stored in the cloud 50 on the other hand, a hierarchy of the agents 30, 32 may be established.

In act "D", for the hierarchy determined, the matching configuration—the agent configuration 60, 62 originally stored in the cloud 50—may be distributed to the respective agents 30, 32. Based on the configuration of the agents 30, 32 thus performed, the latter are enabled to collect the data specified in the agent configuration 60, 62 from the connected sources in accordance with the respective configuration.

This means that a user does not have to configure the agents 30, 32 of an automation solution 10, 12 individually. Rather, the data required for their configuration is distributed via a gateway 54. This uses the hierarchy of the agents 30, 32 established in act "C" to determine the configuration data of the agent configurations 60, 62 intended for the individual agents 30, 32 and loads this data onto the respective agents 30, 32.

Although the disclosure has been illustrated and described in detail based on the exemplary embodiment, the disclosure is not limited by the disclosed example or examples and other variations may be derived here from by the person skilled in the art, without departing from the scope of protection of the disclosure. It is therefore intended that the foregoing description be regarded as illustrative rather than limiting, and that it be understood that all equivalents and/or combinations of embodiments are intended to be included in this description.

The disclosure proposed herein may be summarized in brief as follows: Agents 30, 32 assigned to an automation solution 10, 12 capture their environment, namely devices, services, data sources, and the like that may be reached locally, and this results in the generation of a device list 64. This is compared automatically with an agent configuration 60, 62 available in the cloud 50. Each agent 30, 32 of an automation solution 10, 12 is represented in the device list 64 with data that represents a kind of fingerprint of the agent 30, 32. The agent configuration 60, 62 includes a comparable fingerprint. The comparability is produced in that, during the agent configuration 60, 62, it is specified for instance which data sources an agent 30, 32 is to access. In the device list 64, it is indicated that the agent 30, 32 may access at least these data sources physically and for communication purposes. If there is a matching or sufficiently matching fingerprint of this kind in the agent configuration 60, 62 and in the device list 64, the configuration data contained in the agent configuration 60, 62 may be transmitted to the respective agent 30, 32. The agent 30, 32 configured/parameterized in this way may thus not only in principle access the data sources that may be reached, but with the data from the agent configuration 60, 62 also receives the necessary information about addresses, individual data words and the like. An agent 30, 32 that is identified only by way of which devices, services, data sources and the like it may reach in principle is thus configured and/or parameterized automatically according to the approach proposed here.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for automatically creating data relating to an automation system, the method comprising:
   assigning several software agents to the automation system;
   connecting the several software agents to a cloud via a gateway;
   storing an agent configuration in the cloud for each software agent of the several software agents;
   receiving, by the gateway, data captured by at least one part of the several software agents relating to at least one device, service, and/or data source of the automation system configured to be reached by the respective software agent, wherein the captured data is in a form of a device list; and
   configuring at least one software agent of the several software agents during a processing of one or more agent configurations from the cloud and the captured data relating to the at least one device, service, and/or data source,
   wherein, during the processing of one or more agent configurations from the cloud and the captured data relating to the device list, the gateway automatically detects matches in both data groups, wherein the data groups comprise data from the agent configuration within the cloud and data from the captured data in the device list indicating data sources to be accessed by the respective software agent, and wherein the matches are detected by the gateway by comparing the data from the agent configuration within the cloud with the data from the captured data in the device list, and
   wherein, based on the detected matches, the gateway automatically configures the at least one software agent assigned to the automation system.

2. A computer program product with program code stored on a computer-readable data carrier, wherein the computer program product, when executed by a gateway acting as an interface between an automation system and a cloud, is configured to cause the gateway to:
   assign several software agents to the automation system;
   connect the software agents to the cloud;
   store an agent configuration in the cloud for each software agent of the several software agents;
   receive data captured by at least one part of the several software agents relating to at least one device, service, and/or data source of the automation system configured to be reached by the respective software agent, wherein the captured data is in a form of a device list; and
   configure at least one software agent of the several software agents during a processing of one or more agent configurations from the cloud and the captured data relating to the at least one device, service, and/or data source, wherein, during the processing of one or more agent configurations from the cloud and the captured data relating to the device list, the gateway automatically detects matches in both data groups, wherein the data groups comprise data from the agent configuration within the cloud and data from the captured data in the device list indicating data sources to be accessed by the respective software agent, and wherein the matches are detected by the gateway by comparing the data from the agent configuration within the cloud with the data from the captured data in the device list, and wherein, based on the detected matches, the gateway automatically configures the at least one software agent assigned to the automation system.

3. A gateway that is an interface between an automation system and a cloud, the gateway comprising:

a processing unit and a memory, wherein a computer program is loaded into the memory, wherein when executed during operation of the gateway by the processing unit, the computer program is configured to cause the gateway to:

assign several software agents to the automation system;

connect the software agents to the cloud;

store an agent configuration in the cloud for each software agent of the several software agents;

receive data captured by at least one part of the several software agents relating to at least one device, service, and/or data source of the automation system configured to be reached by the respective software agent, wherein the captured data is in a form of a device list; and configure at least one software agent of the several software agents during a processing of one or more agent configurations from the cloud and the captured data relating to the at least one device, service, and/or data source, wherein, during the processing of one or more agent configurations from the cloud and the captured data relating to the device list, the gateway is configured to automatically detect matches in both data groups, wherein the data groups comprise data from the agent configuration within the cloud and data from the captured data in the device list indicating data sources to be accessed by the respective software agent, and wherein the matches are detected by the gateway by comparing the data from the agent configuration within the cloud with the data from the captured data in the device list, and wherein, based on the detected matches, the gateway is configured to automatically configure the at least one software agent assigned to the automation system.

4. The gateway of claim 3, wherein at least one agent configuration is predefined by a user.

5. The gateway of claim 3, wherein each agent configuration for each software agent of the several software agents is predefined by a user.

6. The gateway of claim 3, wherein at least one software agent of the several software agents is configured to be assigned to the automation system as a functional unit.

7. The method of claim 1, wherein at least one agent configuration is predefined by a user.

8. The method of claim 1, wherein each agent configuration for each software agent of the several software agents is predefined by a user.

9. The method of claim 1, wherein at least one software agent of the several software agents is assigned to the automation system as a functional unit.

* * * * *